No. 752,497. PATENTED FEB. 16, 1904.
G. R. WILSON.
TOASTER OR BROILER.
APPLICATION FILED APR. 25, 1903.

NO MODEL.

Witnesses
Edwin F. McKee
Chas. S. Hoyer

Inventor
George R. Wilson

By Victor J. Evans
Attorney

No. 752,497.

Patented February 16, 1904.

UNITED STATES PATENT OFFICE.

GEORGE R. WILSON, OF HURLEY, SOUTH DAKOTA.

TOASTER OR BROILER.

SPECIFICATION forming part of Letters Patent No. 752,497, dated February 16, 1904.

Application filed April 25, 1903. Serial No. 154,327. (No model.)

*To all whom it may concern:*

Be it known that I, GEORGE R. WILSON, a citizen of the United States, residing at Hurley, in the county of Turner and State of South Dakota, have invented new and useful Improvements in Toasters or Broilers, of which the following is a specification.

This invention relates to a toaster or broiler of that class in which the gridiron is formed of two leaves hinged together and reversible; and the primary object of the same is to provide a device of this class with means for supporting either leaf above a heated surface to more effectively toast bread or broil meat or the like in a regular and even manner and to simplify the construction by including the supporting means as a part of the leaves and avoid the necessity of attaching separate pieces which would readily become detached by heat.

A further object of the invention is to provide a novel catch construction whereby the leaves of the gridiron can be securely locked at their free ends when brought together.

With these and other objects and advantages in view the invention consists in the construction and arrangement of the several parts, which will be more fully hereinafter described and claimed.

Figure 1:
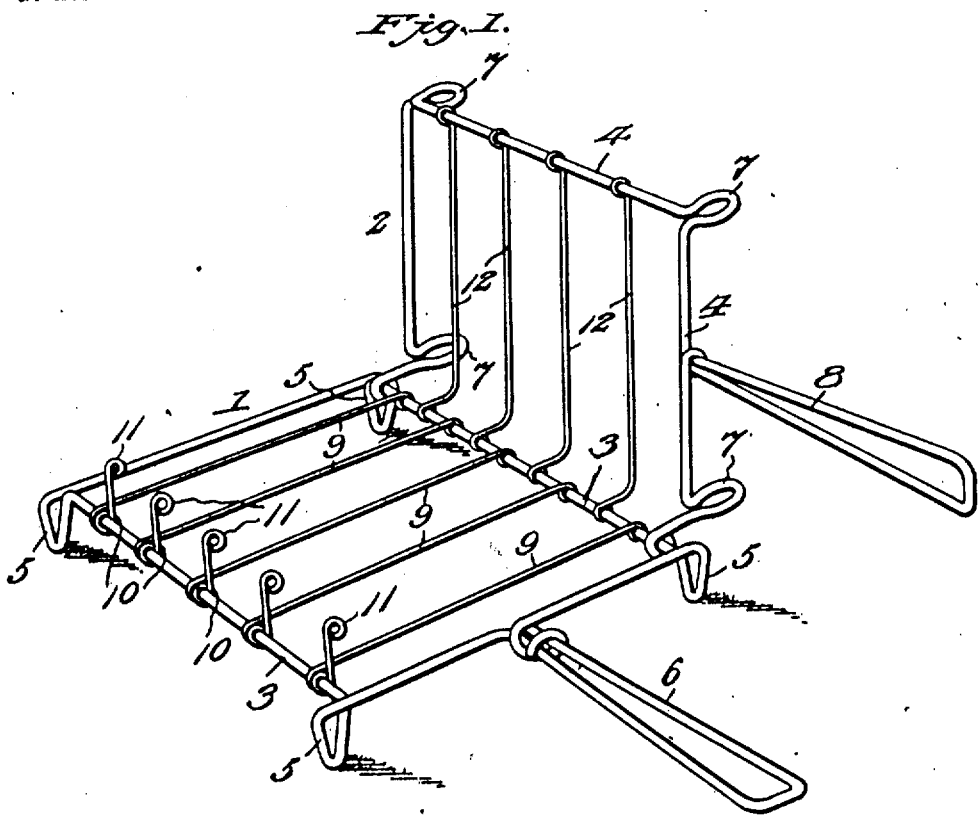
Figure 2:
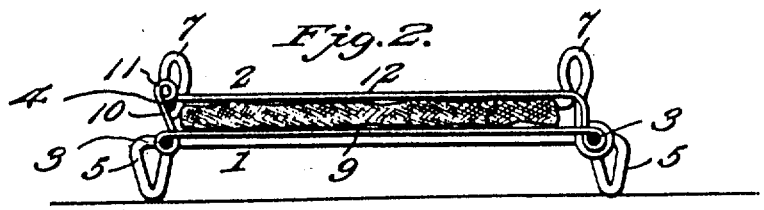

In the drawings, Figure 1 is a perspective view of a toaster embodying the features of the invention and shown open. Fig. 2 is a transverse vertical section of the toaster shown closed and illustrated as holding an article of food between the leaves thereof.

Similar numerals of reference are employed to indicate corresponding parts in the views.

The improved toaster comprises two leaves 1 and 2, each formed of wire and including a stiff margin or frame wire 3 and 4 in the respective leaves. The marginal wire 3 of the leaf 1 is looped at the corners of the leaf to form depending or outwardly-projecting legs 5, and from the center of one end of the leaf the said wire is continued by suitable bends in the form of a handle 6. The marginal wire 4 of the leaf 2 is terminally looped loosely around the one side member of the marginal wire 3 of the leaf 1 to form a hinge connection for said leaf 2, and at the corners of the latter leaf its marginal wire 4 is bent outwardly at an angle to provide looped legs 7. The leaf 2 at the end thereof adjacent to the end of the leaf 1, from which the handle 6 projects, also has the margin-wire thereof continued by suitable bends and formed into a handle 8, similar in length and contour to the handle 6. The leaf 2 is dropped or bent adjacent to its hinge connection to compensate for the thickness of an ordinary slice of bread or other material that may be interposed between the two leaves. Extending across the leaf 1 and firmly secured to the side members of the marginal wire 3 are grid-wires 9, of smaller gage than the said margin-wire, said grid-wires being of a resilient nature and coiled around the outer member of the margin-wire and projected upwardly in the form of spring-catches 10, having loops or eyes 11 at their free ends. Extending from the outer side member of the margin-wire 4 of the leaf 2 to the side member of the margin-wire 3 of the leaf 1, to which said margin-wire 4 is hingedly attached, are grid-wires 12, which are bent inwardly adjacent to the side member of the margin-wire 3, to which they are attached and also movably secured to said latter side member to complete the hinge connection for the leaf 2. Both sets of grid-wires 9 and 12 are of less gage than the margin-wires to which they are attached, and the number of grid-wires used and their distance apart will depend upon the size of the toaster or broiler, and the specific use for which it is constructed.

It will be seen that the improved toaster or broiler is reversible and the leaves thereof will be supported above the heated surface over which they are disposed by the legs 5 or 7. When the bread or other material is inserted between the leaves, the latter become locked by the outer side member of the margin-wire 4 of the leaf 2 springing past and under the loops or eyes 11 of the spring catches 10, projecting upwardly from the outer side member of the margin-wire 3 of the leaf 1, and accidental separation of the leaves during the toasting or broiling operation will thus be prevented. By providing the legs 5 and 7 bread can be more evenly toasted or meat or any other article of food more regularly broiled in view of the fact that both leaves when lowermost will be supported above the heated surface.

The improved device will be found exceptionally useful for the purpose for which it has been devised, and changes in the proportions, dimensions, and minor details may be resorted to without departing from the spirit of the invention.

Having thus fully described the invention, what is claimed as new is—

1. A device of the class set forth comprising two leaves, one being hinged to the other and both at their corners having outwardly-projecting supporting-legs, and a plurality of upstanding spring-catches at the free edge of one leaf to engage the free edge of the other leaf for fastening both leaves to each other to prevent accidental opening movement of the same.

2. A toaster comprising hinged leaves having margin-wires with grid-wires extending thereacross and secured thereto, the grid-wires at the free edge of one leaf being coiled around the margin-wire of said edge and projected upwardly to provide spring-catches to engage the free edge of the other leaf.

In testimony whereof I affix my signature in presence of two witnesses.

GEORGE R. WILSON.

Witnesses:
 GEORGE L. PALMER,
 W. E. MURPHY.